No. 734,254. PATENTED JULY 21, 1903.
R. S. BRYANT.
WHEEL.
APPLICATION FILED MAR. 31, 1903.
NO MODEL.
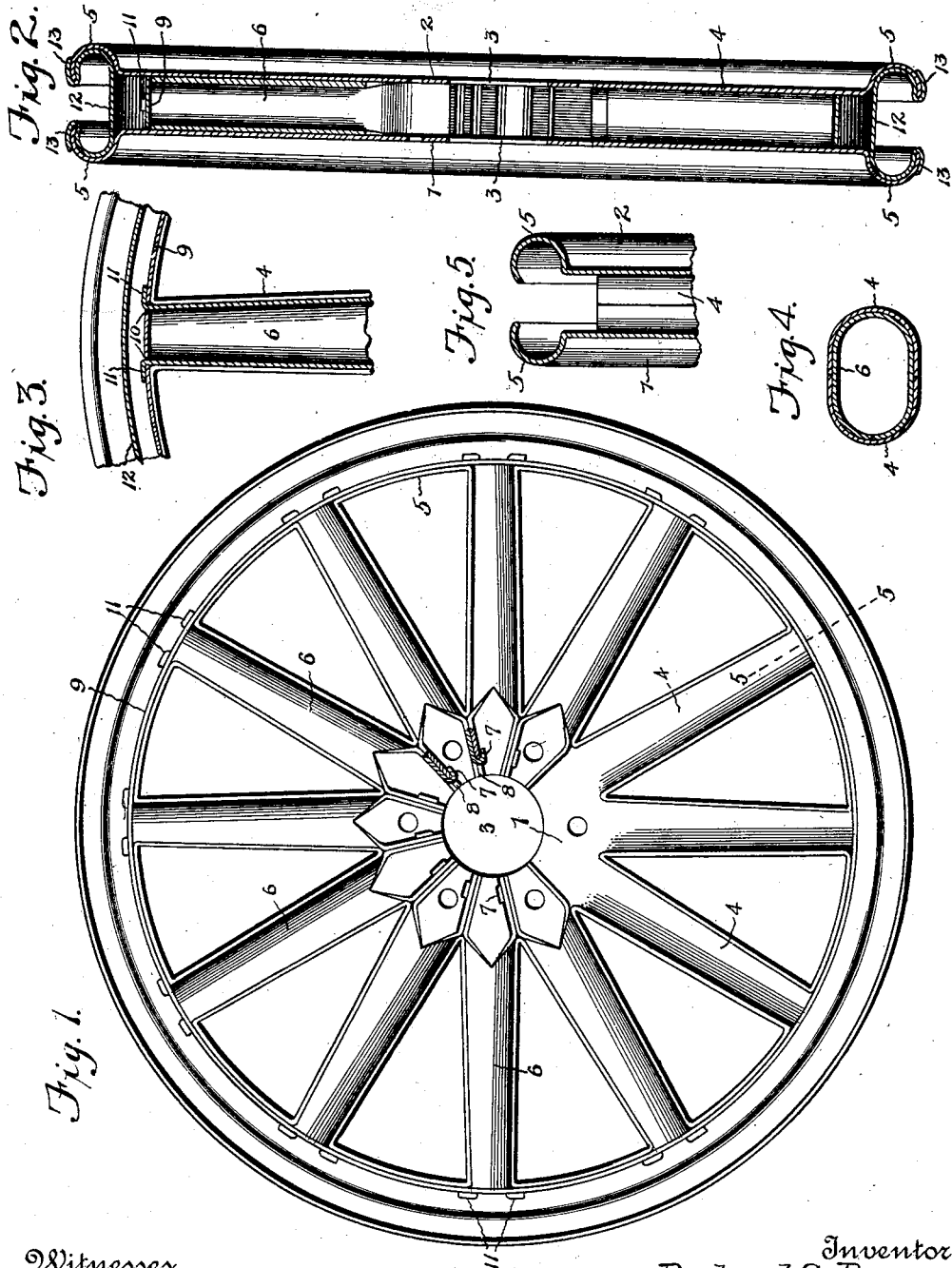
Witnesses
Ralph A. Shepard
H. J. Shepard
Inventor
Richard S. Bryant
By O. C. Shepherd
Attorney No. 734,254.

Patented July 21, 1903.

UNITED STATES PATENT OFFICE.

RICHARD S. BRYANT, OF COLUMBUS, OHIO.

WHEEL.

SPECIFICATION forming part of Letters Patent No. 734,254, dated July 21, 1903.

Application filed March 31, 1903. Serial No. 150,399. (No model.)

*To all whom it may concern:*

Be it known that I, RICHARD S. BRYANT, a citizen of the United States, residing at Columbus, in the county of Franklin and State of Ohio, have invented a certain new and useful Improvement in Wheels, of which the following is a specification.

This invention relates to vehicle-wheels, and has for its object to provide an improved sectional or built-up wheel structure which while useful in many applications is particularly adapted for use in connection with pneumatic and cushioned tires and for application to motor-vehicles.

It is furthermore designed to produce the wheel from sheet metal, which is stamped, cut, or otherwise formed into the several sections of the wheel and the coöperating sections brazed, so as to be strongly, durably, and rigidly connected in an efficient manner.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is an elevation of a wheel constructed in accordance with the present invention, one-half of the frame portion thereof being removed to disclose certain internal portions of the wheel. Fig. 2 is a cross-sectional view of the wheel. Fig. 3 is a detail sectional view illustrating the connection between the outer end of an internal spoke member and the rim. Fig. 4 is a detail cross-sectional view of one of the spokes. Fig. 5 is a detail cross-sectional view taken on the line 5 5 of Fig. 1.

Like characters of reference designate corresponding parts in each and every figure of the drawings.

As hereinbefore indicated, it is an important feature of this invention to form the wheel of sheet metal, and in carrying out this object the wheel comprises duplicate half-sections 1 and 2, respectively, and therefore a description of one section will suffice for both sections. Each section has a flat central portion provided with a circular opening 3 for the reception of any suitable or preferred type of hub. (Not shown, as the hub feature forms no part of the present invention.) From the central portion 1 the spoke members 4 radiate, said spokes being pressed, stamped, or otherwise formed into semicircular or semi-elliptical shape, as best indicated in Fig. 4 of the drawings, with the convex faces of the spokes at the outer side of the wheel-section. The outer ends of the spoke members are connected by an integral rim portion, which is bowed or bulged outwardly at 5 to give it a semi-elliptical shape in cross-section. As shown in Fig. 5 of the drawings, it will be noted that the rim portion 5 is disposed at the outer side of the plane of the central portion of the wheel-section and the spokes are disposed at the opposite or inner side of the section, so that when the opposite wheel-sections are brought together, with the edges of corresponding spoke members in mutual engagement, the free edges of the bowed rim portions 5 are separated by an annular interspace. Prior to bringing the opposite wheel-sections together inner tubular sheet-metal spoke members 6 are fitted snugly in the spoke members of one of the wheel-sections, said inner members tapering outwardly to correspond with the taper of the outer members. Each inner member has its inner end terminated flush with the periphery of the opening 3 in the wheel-section and is cut away at opposite sides, so as to lie flat against the central portion of the wheel-section. Upon reference to Fig. 1 of the drawings it will be seen that the inner end portions of adjacent inner spoke members lie in mutual engagement from the point of intersection of adjacent outer spoke members and the periphery of the opening 3 in the wheel-section and are connected by a tongue 7, which is bent from the inner end portion of one member 6 into a notch or seat 8 in the inner end of the adjacent member. To prevent looseness of the outer ends of the inner spoke members, a metallic band 9 extends circumferentially about the outer ends thereof and is provided with pairs of perforations 10 for the reception of lugs or projections 11 upon the outer ends of the inner spoke members, said projections being bent back against the outer side of the band, so as to form a rigid connection therewith.

Between the rim portions 5 of the wheel-sections a substantially U-shaped supplemental rim member 12 is snugly fitted, so as to bridge the interval between the rim portions 5, with the opposite free edge portions of the supplemental rim bent into the form of flanges 13, snugly embracing the free edges of the rim portions 5, thereby to reinforce and stiffen the same and present smooth rounded edges to the tire, (not shown,) which is adapted to be seated between the rim portions 5.

All of the meeting edges of the opposite wheel-sections are brazed, so as to form a strong, rigid, durable, and water-tight joint between the sections, and thereby to obviate the employment of separate fastenings, which are liable to break and work loose, and thereby render the wheel loose and unserviceable.

By reference to Fig. 4 it will be noted that the inner and outer spokes are arranged to break joints.

Having thus described the invention, what is claimed, and desired to be secured by Letters Patent, is—

1. A wheel composed of opposite half-sections, each section being formed of sheet metal and provided with semitubular spokes and a semitubular rim portion, the spoke members of one section being united to the spoke members of the other section, and a band lying within the rim portion and snugly embracing the outer ends of the spokes.

2. A wheel, composed of opposite half-sections, each section being formed of sheet metal and provided with semitubular spoke members projected at the inner side of the plane of the central portion of the section and having a semitubular rim portion at the opposite and outer side of the section, the spoke members of one section being brazed to the corresponding spoke members of the other section and the rim portions being separated by an annular interspace to receive a tire, and a band lying within the rim portion and snugly embracing the outer ends of the spokes.

3. A wheel comprising opposite sections having semitubular spokes which are open at their outer ends, a band circumferentially embracing the outer open ends of the spokes, and inner tubular spoke members fitted within the outer spoke members and provided at their outer ends with projections passed through perforations in the band and bent back against the latter.

4. A wheel comprising opposite sections having semitubular spoke members, and inner tubular spoke members fitted within the outer spoke members and projected through the inner ends thereof, the inner projected ends of adjacent inner spoke members lying in mutual contact and mutually connected.

5. A wheel comprising opposite sections having semitubular spoke members, and inner tubular spoke members fitted within the outer spoke members and projected through the inner ends thereof, the inner projected end portions of adjacent inner spoke members lying in mutual contact, one of said members having an opening and the other having a projection fitted into the opening to connect the members.

6. A wheel comprising opposite sections having semitubular spokes which are open at opposite ends, tubular spoke members fitted within the outer spokes and projected through the inner ends thereof, the projected end portions of adjacent spoke members lying in mutual contact, one of said projected ends having an opening, and the other having a projection fitted into the opening to connect the members, and a band circumferentially embracing the open outer ends of the outer spokes, the outer ends of the inner spokes having projections fitted into perforations in the band.

7. A wheel composed of opposite half-sections, each section embodying semitubular spoke members and semitubular rim portions, the spoke members of one section being united to the corresponding spoke members of the other section, the rim portions being separated by an annular interspace, and a rim member substantially U-shaped in cross-section snugly fitted between the rim portions with its opposite peripheral edges bent over and embracing the outer edges of the respective rim portions.

8. A wheel composed of opposite half-sections, each section having semitubular spoke members and a semitubular rim portion, the corresponding spoke members being mutually united and the rim portions being separated by an annular interspace, inner tubular spoke members fitted within the outer spoke members, a band between the rim portions and connected to the outer ends of the inner spoke members, and a rim member substantially U-shaped in cross-section snugly fitted between the rim portions with its opposite peripheral edges bent over and embracing the outer edges of the respective rim portions.

RICHARD S. BRYANT.

In presence of—
C. C. SHEPHERD,
A. L. PHELPS.